Sept. 19, 1950  K. C. BRIER ET AL  2,522,662
METHOD FOR PRODUCING STEREOSCOPIC NEGATIVES
Filed Jan. 1, 1945  2 Sheets-Sheet 1
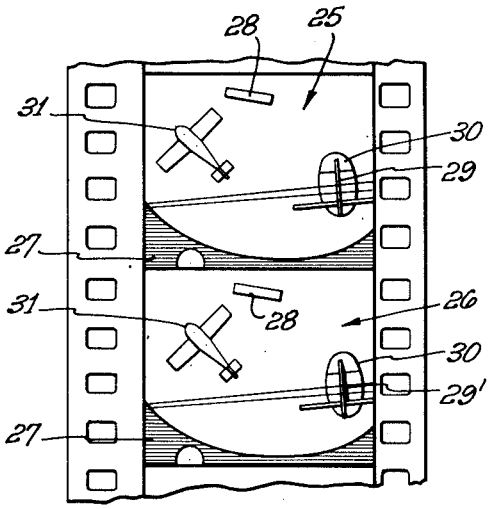
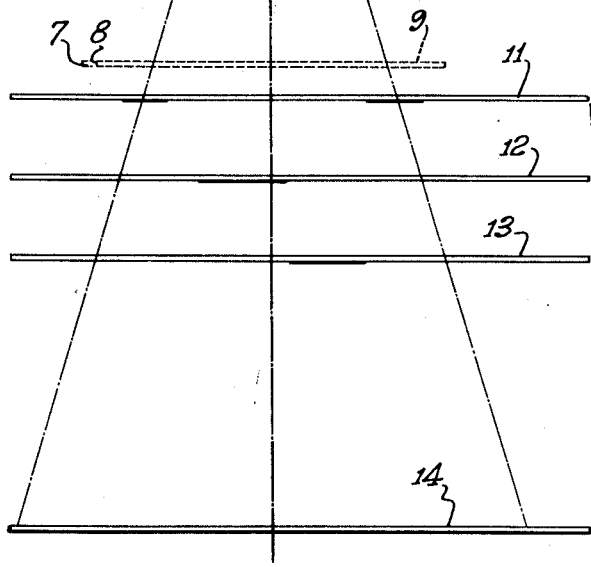
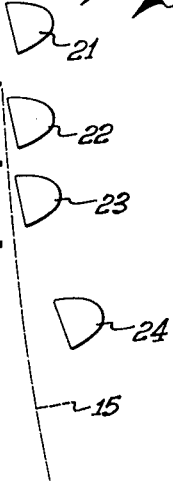
KENNETH C. BRIER,
MORTIMER G. TYLER,
INVENTOR.
BY
ATTORNEY.

Sept. 19, 1950 K. C. BRIER ET AL 2,522,662
METHOD FOR PRODUCING STEREOSCOPIC NEGATIVES
Filed Jan. 1, 1945 2 Sheets-Sheet 2
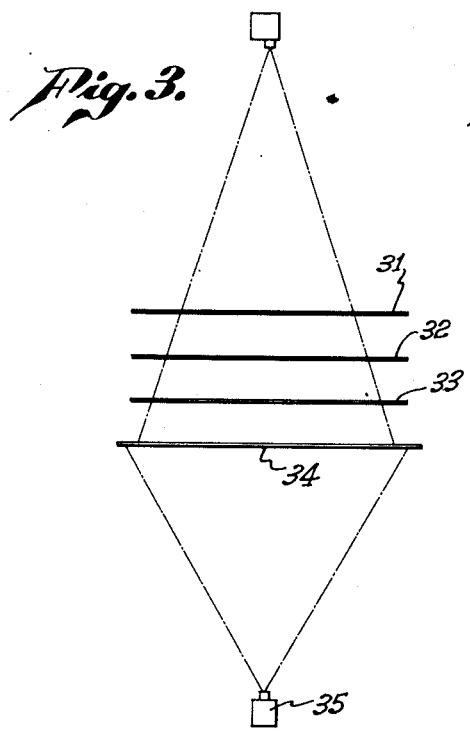
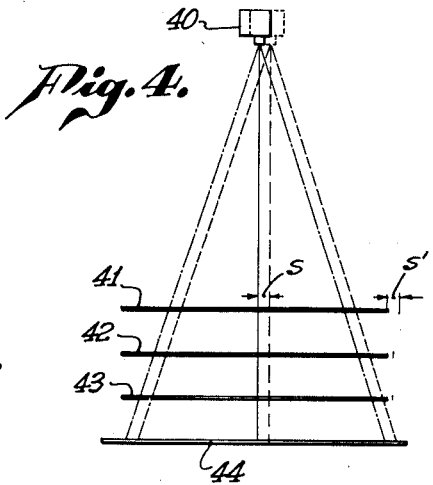
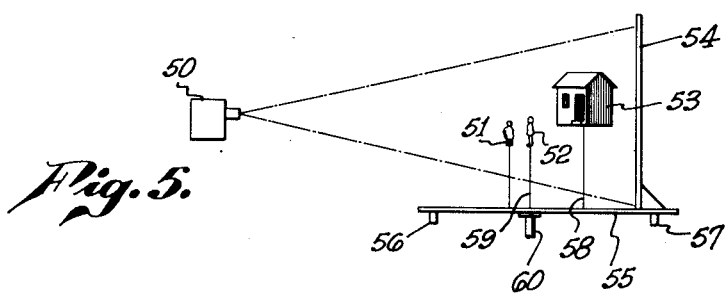
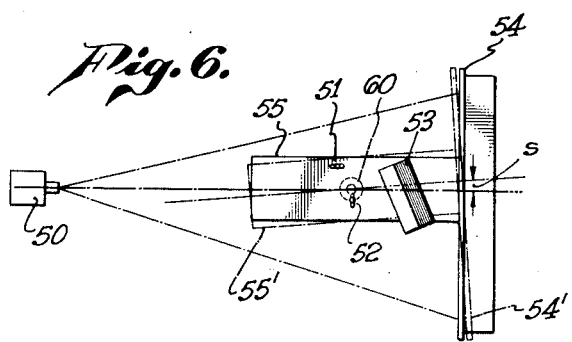
KENNETH C. BRIER,
MORTIMER G. TYLER,
INVENTOR.
BY
ATTORNEY.

Patented Sept. 19, 1950

2,522,662

UNITED STATES PATENT OFFICE 2,522,662

METHOD FOR PRODUCING STEREOSCOPIC NEGATIVES

Kenneth C. Brier and Mortimer G. Tyler, North Hollywood, Calif.

Application January 1, 1945, Serial No. 570,836

7 Claims. (Cl. 88—16)

This invention pertains to methods of producing three-dimensional effects in animated cartoon photography. More specifically stated, the invention relates to methods whereby photographic images may be obtained of miniatures or pictorial representations, these photographic images being capable of reproduction by projection upon a screen so as to permit the observers to see the objects depicted in the pictorial representations at different spatial positions, thereby creating an effect of depth, roundness and perspective which is characteristic of ordinary binocular vision of real objects in spatial positions.

In the production of animated cartoon motion picture films, various elements or objects entering into the composition of a finished picture are generally represented by line drawings or paintings upon separate transparent cells which may be made of glass, celluloid or other transparent plastic. Not only are objects in different spatial positions represented upon different sheets of celluloid but often objects in the same spatial plane are depicted upon separate cells. These various cells are positioned within the field of view of a camera and stop motion photography is employed in obtaining photographic images of the combination of elements so as to give a pictorial whole. When movement or action is to be represented, a new cell is substituted for one of the previously used cells, the new cell showing the object in a slightly different position.

Although the artists employed in producing the drawings or paintings are highly skilled and the pictorial representations are of such size as to create a pictorial effect of distance or perspective, these animated cartoon films upon projection do not create the illusion of depth and the observer is conscious of the fact that the image is being projected upon a screen and all of the lines or objects depicted appear in a fixed plane, namely, the plane of the projection screen.

The present invention is directed to a method whereby actual three-dimensional effects may be obtained so that the observer may be unmistakably conscious of the spatial position of objects depicted. Some of the objects may be in the plane of the projection screen; others may be beyond the screen and at a greater distance from the observer, while still others may be in front of the screen.

It is acknowledged that in the past attempts have been made to produce the effect of depth by the use of anaglyphs whereby a solid effect is obtained by projecting bi-colored images upon a screen and observing them through color filters. The view was photographed simultaneously from two positions spaced an interocular distance with parallel optical axes. In this manner, two photographic images were obtained, all of the objects or elements of one image being displaced horizontally with respect to the images of such objects carried by the other photographic image. These two images were suitably dyed with complementary colors and upon being projected upon a screen, an observer provided with light filters which would permit the left eye to see only the left eye image and the right eye to see the right eye image, obtained an effect of roundness and depth. The use of binocular cameras involves such great changes from normal procedure and such meticulous care in the preparation of the projection films that this method of operation has not been used to any material extent.

The method of the present invention distinguishes from these prior methods in that it is primarily directed to the production of animated cartoon films wherein entirely different problems arise and stop motion photography may be used. Moreover, the original negative films obtained by the method of this invention may be said to be in registry as to images in any desired or predetermined spatial plane whereas images in other planes are suitably displaced. If, for example, it is desired to create the effect that all objects except the foreground objects in the view occupy positions in planes beyond the plane of the viewing screen, then on the original negatives obtained by our method the foreground objects are in registry with each other while the others are displaced in a horizontal direction.

In other words, in such exemplary case the images of the foreground objects are capable of assuming a superimposed position, in registry, when the picture areas of the two photographic views are superimposed or registered with respect to each other by means of the customary film perforations. For this reason the method of the present invention simplifies the manufacture and production of finished films since the critical placement of the respective photographic images upon a strip of motion picture film during printing and in the laboratory has been obviated. It is to be remembered that the horizontal displacement of photographic images on a strip of film is measured in ten thousandths of an inch since upon projection the images are greatly enlarged. Obviously, when a printing operation has to be conducted so as to shift one image with respect to another a distance to be measured in ten thousandths of an inch, the printing operation becomes uneconomical, burdensome and commercially impractical.

In carrying out the method of this invention, pictorial representations of various objects located in desired spatial planes of the complete view, are positioned within the field of view of a camera. A photographic image is obtained and then, preferably without changing the position of the camera, certain of these cells or pictorial representations are shifted transversely, the amount of shift varying with and being controlled by the spatial position of object representations carried by the cells and the ratio of width of photographic field of the cell to the width of projection field during projection.

In the event objects in the foreground are to appear in the plane of the viewing screen, cells carrying representations of objects in the foreground are not shifted. Cells carrying pictorial representations of objects at a greater distance from the observer are shifted transversely in one direction. Cells carrying pictorial representations of objects which are to appear between the foreground and the observer are shifted transversely in the opposite direction. When this transverse shifting is carried out in accordance with the formulas and instructions herein contained, the arrangement of cells is again photographed. When prints of these two views are projected upon a viewing screen, either simultaneously or in rapid succession, and viewed through suitable observation screens, the observer is conscious of depth and of the proper placement of each object.

As previously stated, the printing operation (conversion of the negatives into positives) is a simple one. Moreover, the method herein disclosed is capable of being used in the reproduction of animated cartoons having true depth and stereoscopic effect even though these pictures are projected in natural colors. Natural color stereoscopic photography is not known in the prior art.

It is an object of the present invention, therefore, to disclose and provide methods whereby true stereoscopic animated cartoons may be readily and quickly attained.

A further object of the invention is to disclose and provide methods whereby animated cartoons in substantially natural colors (as well as in monochrome) may be easily attained for stereoscopic reproduction.

Another object of the invention is to disclose and provide methods whereby the proper positioning of miniatures, puppets and other pictorial elements may be readily and accurately attained during the production of stereoscopic views adapted for projection in rapid succession upon a viewing screen.

These and other objects and advantages of the inventions embodied herein will be readily appreciated by those skilled in this art from the description given hereinafter. In order to facilitate understanding, the description will refer to the appended drawings, in which:

Fig. 1 is a schematic representation of an arrangement of cells which may be used in obtaining the novel films and effects herein described.

Fig. 2 is a representation of a strip of motion picture film carrying the stereoscopic images made in accordance with this invention.

Fig. 3 schematically illustrates an arrangement which may be used in carrying out a modified form of process embraced by this invention.

Fig. 4 schematically illustrates a still further modification of the process.

Figs. 5 and 6 are side and plan views respectively of an arrangement which may be used in carrying out the method of this invention with miniatures or puppets.

It is to be remembered that the drawings are exemplary only and that these drawings, as well as the description relating thereto, are being given for purposes of illustration and are not to be considered as limiting.

In the typical arrangement illustrated in Fig. 1, a stop motion camera is indicated at 10 with its axis vertical. Positioned within the field of view of the camera are cells 11, 12 and 13, each cell bearing pictorial representations of objects or elements of a complete view which includes the pictorial representations carried by a background cell or plate 14. The background cell 14 may, of course, be opaque.

The cells 11, 12 and 13 are preferably made of transparent material and carry the desired pictorial representations of objects, the area of each object being opaque to light. It is to be remembered that these pictorial representations carried on cells 11, 12 and 13 have been painted by artists so that from the point of view of the camera these objects are of the desired size with respect to the background elements and to each other. The spacing between cells 11 and 12, 12 and 13, 13 and 14, etc., permits light to be supplied from side sources, such as the sources 21, 22, 23 and 24, upon each of the cells. The spacing between cells does not ordinarily control the effect of perspective, the physical size of the pictorial representations being determined by the artist who prepared them. It may be assumed that cell 11 carries a pictorial representation of a foreground object whereas cells 12 and 13 carry representations of middle ground objects. For purposes of example, moreover, it may be assumed that upon projection the foreground object (carried by cell 11) is to occupy a plane substantially coincidental with the plane of the viewing screen.

In order to obtain two photographic images on motion picture film, one of the images being a stereoscopic complement of the other, an exposure is made using the arrangement shown in Fig. 1, thereby photographically recording upon the picture area of the film a view consisting of the composite of the various pictorial representations carried by cells 11, 12, 13 and 14. Thereafter, cells 12, 13 and 14 are shifted transversely. The amount of shift of each cell is controlled by the spatial position of the object representation carried by the cell and the ratio of width of photographic field of the cell to the width of projection field during projection. If, for example, cell 12 carries a pictorial representation of an object located substantially 20' beyond the objects depicted on the foreground cell 11 and the field of view or area being photographed by cell 12 is 15" wide whereas the projection screen upon which the final films will be projected is 150" wide and the average distance of the spectator from such projection screen is 40', then cell 12 will be shifted in a direction parallel to the bottom of the field of view (transversely) a distance of $$\frac{20' \times 2.5''}{60'} \times \frac{15''}{150''} = 0.08''$$

The denominator 60' in the above computation is obtained by adding the distance of the object from the foreground or screen (20') and the distance of the screen from the spectator (40'). In the event either distance exceeds about 600', it may be dispensed with entirely, as in the following case. In the event the background cell 14 carries pictorial representations of objects which are supposed to be positioned at a distance of more than about 600' from the observer, then the cell 14 would be shifted a distance of $$2.5'' \times \frac{24''}{150''} = .4''$$

In this latter instance the distance between the observer and the objects depicted in the background is substantially the same as the distance between the screen and the spatial position of such background objects. The width of the field of view of the camera on the background cell (in the example given) is assumed to be 24". Moreover, in nature stereoscopic vision ceases at distances in excess of about 600'.

After shifting the cells transversely in accordance with the directions here given, another photographic exposure is made upon another picture area of the film in camera 10 and a stereoscopic complement of the first made photographic image is thus obtained.

It will be noted that since the foreground cell 11 was not shifted with respect to the optical axis of the camera 10 during the taking of these two stereoscopic complements, the images of the pictorial representations carried by cell 11, recorded upon these two stereoscopic complements, will be in absolute registry. The images of all other elements of the complete view will be shifted or displaced to a properly coordinated degree so that if prints are made of the film thus produced by camera 10 and such prints are then projected and viewed under proper conditions, a true stereoscopic or third dimensional effect is obtained.

It may be noted at this time that in the formula given hereinabove it was assumed that the average interocular distance is 2.5". The stereoscopic complements obtained corresponded to left eye and right eye images respectively. The amount of transverse shift is graphically and schematically illustrated by the dotted line 15, the edges of cells 12, 13 and 14 being moved to new positions established by the line 15.

It is further to be noted that the line 15 is not straight, thereby graphically illustrating that the transverse shift of the cells is not a mechanical or straight line function but is dependent upon the application of the principles and directions hereinabove referred to. Moreover, in actual practice charts are prepared so that the cameraman may readily adjust the cells in order to obtain stereoscopic pairs. An apparatus for properly positioning the cells and moving them transversely is described in Patent No. 2,198,006 issued to William E. Garity April 23, 1940.

The stereoscopic pairs or complements obtained in the manner described may be printed by ordinary contact printing or optical printing so as to produce a film capable of reproduction and exhibition. If the final film is to be in the form of an anaglyph, the left eye images may be printed in one color and the right eye images in another. Blue and red are exemplary colors. The spectator is then provided with glasses or color filters, the filter positioned before the left eye being capable of permitting the projected left eye image to reach the left eye but to effectively screen out projected right eye complement. The screen positioned in front of the right eye is then adapted to permit only the right eye impression to reach such eye and to effectively screen out the projected left eye image. However, such anaglyphs obviously do not permit the reproduction of stereoscopic pictures in natural colors. For this reason the preferred prints are viewed by the use of polarizing screens and polarized light. In this method of reproduction the negative, produced as above described, is utilized in printing left eye images upon one film and right eye images upon another film or sheet. These sheets have polarization characteristics such that all light polarized in one plane is transmitted and in the other plane the light which is not absorbed by the image is also transmitted. One of the sheets preferably carries the right eye images and the other the left eye images. The two sheets or printed films may be of equal length so that when the sheets are then joined together in registry, the two complementary stereoscopic pairs are in superimposed relation. If desired, however, the images on each sheet may be spaced one frame so that when the two sheets are joined, the stereoscopic pairs will be presented in rapid succession instead of simultaneously. When films of this character are employed, the observer is provided with spectacles or lenses carrying neutral (uncolored) polarizing analyzers, the analyzer positioned in front of the left eye of the observer having its axis crossing the axis of polarization of the right eye image so that only the left eye image will be seen with the left eye and only the right eye image with the right eye.

In projecting such films, a non-depolarizing viewing screen is preferably used. In the event the camera 10 employed in carrying out the method of this invention is a three color camera capable of obtaining three color, separation negatives upon each exposure, such three color, separation negatives may be employed in producing three separate sheets, the stereoscopic complements being also printed upon three separate sheets and the entire asembly joined to form a composite film bearing stereoscopic images adapted to be viewed upon projection through suitable analyzers. One method of making such prints is described in Patent No. 2,289,714 issued to Land July 14, 1942. It is to be understood, however, that various and sundry methods of utilizing the negatives made in accordance with the methods of this invention may be employed.

The description given hereinabove has been limited to the production of but a single stereoscopic pair but the entire length of film is obtained by carrying out the operations hereinbefore described in repetitive succession. Those familiar with the art of animated cartoon photography will appreciate that in the event cell 12 carries a pictorial representation of an object exhibiting movement, then after the arrangement of cells shown in Fig. 1 has been photographed both in the original position and in the shifted position, cell 12 may be removed and another cell substituted therefor showing the object in a new or advanced position, whereupon the combination of cells is again photographed, then shifted transversely in accordance with the invention here disclosed and again photographed so as to form the second or successive stereoscopic pair of images. In other words, the performance of the method contemplates an exchange of cells.

Moreover, one or more of the cells, such as cells 12 and 13, may be moved toward or away from the camera 10 between pairs of exposures so as to create the appearance of movement of the object depicted on such cells either toward or away from the observer.

A further modification may include the step of moving the entire camera 10 bodily toward or away from the arangement or asembly of cells between pairs of exposures, thereby giving rise to what is known as a perambulator or trucking shot.

In some instances a middle ground object depicted upon a middle ground cell, such as the cell 12, is of considerable depth. For example, by reference to Fig. 2 (which depicts a portion of a strip of film made in accordance with this invention, such strip of film bearing a stereoscopic pair of images, the picture area 25 carrying a left eye image and the picture area 26 carrying a right eye image), it will be seen that the picture area 25 depicts as a foreground object the instrument panel 27 of an airplane so that the observer appears to be looking over the edge of the instrument panel downwardly toward an aircraft carrier 28. Immediately in front of the airplane in which the observer appears to be seated is another airplane whose rudder is indicated at 29 and fuselage at 30. At a greater distance from the observer is another airplane 31. Since the observer sees the middle ground airplane from a position immediately in back of the fuselage, such middle ground airplane has considerable depth. The pictorial representation of this middle ground aircraft may well be carried upon a cell, such as 12, but in order to create the effect of depth, it is desirable to use one cell 12 which shows the aircraft in the position illustrated in picture area 25 of Fig. 2, and another cell which is to be substituted for cell 12 in the taking of the right eye stereoscopic complement, this new cell showing the rudder 29' slightly displaced to the left of the center line of the fuselage 30, as illustrated in picture area 26. This new cell is substituted for the original cell 12 and then cells 12, 13 and 14 are shifted. In this manner, not only is the depth of view or the depth occupied by the middle ground airplane emphasized but a much more realistic effect is obtained. These new or substitute cells are readily made since in large part they are tracings of the original cell.

Attention has been called to the fact that upon projection the films made in accordance with this invention permit the observer to properly see each object depicted in proper spatial relation and that the objects thus seen by the observer may appear to be either in front of or in back of the projection screen. In the event an object is to be depicted in front of a screen, the transverse shift is negative in character. If, for example, the arrangement shown in Fig. 1 is employed and the foreground cell 11 is supposed to depict objects lying in a plane substantially coincidental with the plane of the viewing screen and it is now desired to depict an object in space between the observer and the screen, then and in that event a cell is employed between cell 11 and the camera 10, such as for example the cell 9.

After the assembly of cells 9, 11, 12, 13 and 14 has been photographed to obtain a left eye image, cells 12, 13 and 14 are shifted transversely as previously described but cell 9 is shifted transversely (in accordance with the same principles as hereinbefore stated) but in the opposite direction, for example, from point 8 to point 7, the extent of such negative shift being calculated as previously mentioned.

Upon projection of such stereoscopic pair, the observer will be cognizant of an object in space between him and the viewing screen. In actual practice it has been found that such images may be caused to approach the observer to a spatial point of two or three feet from the observer but such close approach is not recommended because of the psychological effect and strain.

Those skilled in the art will appreciate from a contemplation of the last-mentioned modification that the method permits the establishment of any desired plane as the plane of the "window" through which the observer is looking. For example, even though the screen is at a distance of 60' from the observer the so-called foreground plane beyond which all other action appears to take place may be established at a point 50' away from the observer. On the other hand, even though the projection screen is 60' from the observer, the fixed window or observer plane beyond which action appears to be taking place may be established as a distance of 100' away from the observer. These various modifications therefore permit numerous effects to be obtained with great realism, not only for purposes of entertainment but also for educational purposes. Stereoscopic motion pictures of this character have been used to great advantage in causing air cadets to actually experience the effects of a dive from a high altitude into close proximity with the deck of an enemy aircraft carrier, followed by the upward zoom, and resulting blackout. Films of this character have also been employed in teaching the construction and operation of complex mechanisms since each element, gear and cam can be shown in proper perspective and spatial position on a greatly enlarged scale.

In order to assure proper manipulation during the photographic steps whereby stereoscopic complements are obtained, the following further instructions should be kept in mind. Whenever the camera is moved along the optical axis during the photography of a scene, such movement should only take place between successive pairs of exposures. Moreover, when the camera is so moved, the field of view is changed and the transverse shift must be changed or varied in accordance with the variations in the magnitude of the field of view and the resulting variation, if any, in the spatial position of the object or element depicted. In other words, such manipulation contemplates varying the transverse shift in accordance with variation in the distance between the camera and the cells.

In some instances, although the actual distance between the camera and a cell plane may be constant, the cells employed in such plane (during photography of a scene) may depict an element moving toward or away from the observer. In other words, the scene may be employing a series of cells, each cell showing the object or element at a progressively greater (or progressively shorter) distance from the observer. In such case the field of view of the camera on such cell plane is constant but since the spatial position of the element is at a varying distance from the observer, the shift is varied in obtaining the successive stereoscopic pairs of images.

Although specific reference has been made herein to the use of cells, it is to be remembered that substantially the same manipulative steps can be employed in the event the objects or elements are in the form of miniatures or puppets.

Reference has been previously made herein to the fact that the foreground objects or elements may be so photographed as to assume a position in space (upon projection) either in front of or in back of the projection screen. This is a very important and valuable characteristic of the invention. Not only can foreground objects appear in a plane between the observer and the viewing screen but middle ground objects may simultaneously appear in space in front of the viewing screen. The method thereby obviates the undesirable, unreal and artificial effect which would be attained if the apparent plane in space in which the objects could appear to the observer was limited to a plane virtually coincidental with the viewing screen, since in the latter case any pictorial representation which may approach the observer more closely would have its edges cut off by the limits of the picture area projected upon the viewing screen. This undesirable effect is eliminated by the method of the present invention.

The desirability of employing the formula and instructions given herein will be emphasized if an example is contemplated in which cells 12 and 13 are spaced apart as shown in Fig. 1 but the representations carried by such cells are of objects in the same spatial plane. The apparent distance of these objects to the spectator remains the same but since the field of view of the camera on cell 13 is greater than on cell 12, the transverse shift which needs to be imparted to cell 13 is greater than that given cell 12. The spacing of cells 11, 12, 13 and 14 (during photography) does not necessarily represent the relative spatial positions of the objects depicted thereon and does not control (per se) the amount of transverse shift which is to be imparted thereto between periods of photography in obtaining the stereoscopic pairs.

In some instances the objects (or characters) which are to appear in the central, foreground or background plane are not drawn or delineated but instead comprise photographs of real or live objects or characters. Although photographic enlargements of such characters may be used in the same manner as the cells heretofore referred to, the photographic images may be used in projected form. If, for example, such live action pictures are to be used as a background, and cartoon or imaginative objects are to be depicted in the foreground, the arrangement shown in Fig. 3 may be used with advantage. Projector 35 may project live action upon the background translucent screen 34. Cells 31, 32 and 33 may carry pictorial representations of objects. In the event all the objects on cells 31, 32 and 33 are to be made to appear as if between the observer and the viewing screen and the live action in the plane of the viewing screen, then cells 31, 32 and 33 are shifted between each pair of successive exposures in conformity with the directions previously stated, while the axes of the projector 35 and the camera are unchanged.

In a still further modification of the methods the following steps may be used: After establishing which of the cell planes carries representations which it is desired to depict in virtually the plane of the projection or viewing screen, and after the first photographic image is obtained, the camera and the selected cell are jointly shifted transversely a distance equivalent to the distance which the background cell would ordinarily be shifted. The background is held in its original position. Intermediate or other cells are then shifted with respect to the camera axis in accordance with the fundamental rules hereinbefore expressed.

The last-referred to modification is diagrammatically illustrated in Fig. 4. As there shown, the camera 40 is directed toward a background 44 and cells 41, 42 and 43 are positioned between the background and the camera. After an exposure has been made upon an area of film in the camera 40, the camera 40 is shifted horizontally a distance indicated at S, this distance being determined in accordance with the instructions given hereinbefore. If, for example, the background cell 44 depicts objects at a distance of more than 600' from the observer, then the camera is shifted that fraction of the assumed average interocular distance which is obtained by multiplying it by the ratio between field of view of the camera on the background cell and the field of view on the viewing or projection screen. The operator then establishes which of the pictorial representations (carried by cells 41, 42 and 43) is to be depicted virtually in the plane of the projection screen. If cell 41 is to carry images which are to appear as if in the plane of the projection screen, then cell 41 is shifted in the same direction as the camera axis, this distance being also indicated at S'. Cells depicting objects beyond the plane occupied by the foreground objects on the projection screen and the background depicted by cell 44 are then shifted in accordance with the formulas and instructions previously given, the amount of shift decreasing with distance from the observer so that the actual displacement between the new position of the camera axis and the pictorial representations on these cells is progressively increased. A second exposure is made with the camera in its displaced position but with its axis parallel to that occupied during the first exposure. Obviously, the background images carried by cell 44 will be displaced in greatest amount whereas the images of objects which are to appear in the plane of the projection screen will be in superimpositionable registry with the images of the same objects carried on the other member of the stereoscopic pair.

It is to be remembered that in the methods contemplated by this invention, stop motion photography is employed so that the horizontal shift of the camera 40 between successive exposures is entirely feasible.

In the event miniatures or puppets are employed, an arrangement such as is illustrated in Figs. 5 and 6 may be used. As there shown, the camera 50 is directed toward a background 54 mounted upon a horizontally extending member 55 supported upon suitable elements 56 and 57. The supporting member 55 may carry various puppets, miniatures or the like. It may also carry some pictorial representations on transparent cells. For purposes of simplicity, the supporting member 55 is shown carrying a miniature house 53 and manikins or puppets 52 and 51. These various puppets and miniatures may be supported in any suitable manner from the supporting element 55 as, for example, by means of extremely thin transparent rods 58 and 59. The rods may be made of an acrylic resin, glass or other suitable material.

In obtaining stereoscopic pairs with the arrangement illustrated in Figs. 5 and 6, the arrangement is photographed by the camera 50 so as to obtain one member of a stereoscopic pair. The operator then establishes which of said objects is to be depicted virtually in the plane of the projection screen upon which the images are to be exhibited. If, for example, the manikin 52 is to be depicted in the projection screen plane, the supporting member 55 is pivoted about a point 60 which lies in a transverse plane passing through the manikin 52 and in a vertical plane passing through the camera axis. The entire supporting member 55 with its various miniatures, manikins, background, etc., is then pivoted about the point 60 so as to cause a horizontal displacement of the background 54 a distance S which has been calculated in accordance with the factors previously referred to. Since the manikin 52 is closely adjacent the axis of rotation of the supporting member 55, such manikin will not be shifted. Other objects, puppets, manikins, miniatures, etc., carried by the supporting member 55 will, however, be shifted either in one direction or the other, the amount of shift being substantially that required by the formula $$\text{Shift} = \frac{P_o \times I_d}{P_s + P_o} \times \frac{W_f}{W_s}$$

wherein $P_o$ is the apparent distance of the object whose representation is carried by the cell from the plane of the viewing screen, in feet; $P_s$ is the average estimated distance of a spectator from the viewing screen, in feet; $I_d$ is the estimated average interocular distance, in inches; $W_f$ is the width of the field of view, in inches, on the cell; $W_s$ is the width of the field upon projection into the viewing screen, in inches.

The displaced or partially rotated position of the supporting member and the background is shown in dotted lines at 55' and 54'. The minor shifts of the manikin 51 and miniature 53 have not been shown in order to avoid confusion. Suffice it to say that the camera 50 again records a photographic image of the background and objects in their shifted position to obtain a stereoscopic complement to the image first recorded.

From the description given hereinabove it will be noted that the method is applicable wherever stop motion photography is employed. The stereoscopic pairs obtained in accordance with the present invention may either be in ordinary black and white or may be in the form of color separation negatives. When three-color photography is used, each exposure period results in three color separation negatives so that the so-called "stereoscopic pair" consists of three color separation negatives representative of the left eye image, and three color separation negatives representative of the right eye image.

The method of the present invention is not limited to any particular method of processing the negatives, combining them or exhibiting them. Although the method results in negatives having novel characteristics (in that objects in a predetermined plane are in superimpositionable relation whereas images of other objects are suitably displaced in a direction parallel to the bottom of the picture area) positive prints of these images will also have this desirable characteristic. The term "negative" is therefore used generically herein and includes both original negatives, contact prints, positive images obtained by reversal projection, printing imbibition, or any other process. All changes and modifications coming within the scope of the appended claims are embraced thereby.

We claim:

1. A method of producing stereoscopic motion picture strip film adapted for projection upon a viewing screen, comprising: making an original negative strip film bearing pairs of stereoscopic photographic images in succession by positioning a plurality of cells in a plane transverse to the optical axis of a camera and within the field of view thereof, said cells bearing pictorial representations of objects at different spatial positions; exposing a picture area of a perforated motion picture film to said cells to obtain one photographic image thereof; shifting said cells in a direction parallel to the bottom of the field of view; regulating the amount of such shift of each cell by the spatial position of the representation carried by the cell with respect to a spectator, the spatial position of the representation with respect to a screen upon which said photographic images are to be projected, and the ratio between width of field of view on the cell and the width of said field on projection; and then photographing the shifted cells upon an adjacent area of said motion picture film to obtain a stereoscopic complement of the first-made image, said first-made image and its complement constituting a stereoscopic pair in sequential position on the original negative motion picture film, each such pair of images including components at projection screen distances which are in superimpositionable relation and in registry with perforations of said motion picture film; repeating the operations hereabove defined to produce successive pairs of images on said motion picture film; and printing said strip motion picture film without altering the relationship of the images with respect to the perforations to obtain a motion picture film suitable for projection upon a viewing screen.

2. A method of producing stereoscopic motion picture strip film adapted for projection upon a viewing screen comprising: making an original negative strip film bearing pairs of stereoscopic photographic images in succession; positioning a plurality of cells in a plane transverse to the optical axis of a camera and within the field of view thereof, said cells bearing pictorial representations of objects at different spatial positions, one of the pictorial components being depicted at projection screen distance from the observer; exposing a picture area of a perforated motion picture film to said cells to obtain one photographic image thereof; shifting said cells other than that depicting components at projection screen distance, in a direction parallel to the bottom of the field of view, regulating the amount of such shift of each cell in accordance with the spatial position of the representation carried by the cell with respect to a spectator, the spatial position of the representation with respect to a screen upon which said photographic images are to be projected and the ratio between width of field of view on the cell and the width of said field on projection; and then photographing the shifted cells upon a different picture area of said film to obtain a stereoscopic complement of the first-made image whereby said images will include components at projection screen distances which are in superimpositionable relation and in registry with perforations of the film upon which the images are recorded; replacing one of said cells with a cell bearing a pictorial representation of the same pictorial component in a different position; repeating the operations hereabove defined for each pair of successive images to obtain a succession of pairs of stereoscopic images in which components are in registry with perforations of the film; and printing said negative strip film without altering the placement of the images with respect to perforations of the film to obtain a strip motion picture film suitable for projection upon a viewing screen.

3. A method of producing stereoscopic motion picture strip film adapted for projection upon a viewing screen comprising: obtaining an original negative strip film bearing pairs of stereoscopic photographic images in succession by positioning a plurality of cells in spaced planes transverse to the optical axis of a camera and within the field of view thereof, said cells bearing pictorial representations of objects at different spatial positions, one of the pictorial components being depicted at projection screen distance from the observer, another of said cells bearing pictorial representations of components at a distance of more than about 600 feet from the observer; exposing a picture area of a perforated motion picture film to said cells to obtain one photographic image thereof; shifting said cells, other than that depicting components at projection screen distance, in a direction parallel to the bottom of the field of view, the amount of shift imparted to the cell bearing pictorial representations at a spatial distance of more than about 600 feet being controlled by the ratio between the width of the field of view on such cell and the width of a projection screen upon which said photographic images are to be projected; and then photographing the shifted cells upon a different picture area of said film to obtain a stereoscopic complement of the first-made image whereby images of the components depicted at projection screen distance from the observer are in superimpositionable relation and in registry with perforations of the film upon which the images are recorded repeating the operations hereabove defined for each pair of successive images; and printing said negative strip film by normal methods to obtain a strip motion picture film suitable for projection upon a viewing screen.

4. In a method of obtaining original negative strip motion picture films bearing successive pairs of stereoscopic photographic images, the steps of: positioning a plurality of cells in a plane transverse to the optical axis of a camera and within the field of view thereof, said cells bearing pictorial representations of objects at different spatial positions, one of said cells bearing a pictorial component to be depicted at less than projection screen distance from the observer and other cells bearing pictorial components depicted at more than projection screen distance from the observer; exposing a strip motion picture film provided with perforations and carrying a photographic emulsion to said cells to obtain one photographic image thereof; shifting said cells in a direction parallel to the bottom of the field of view, regulating the amount of said shift of each cell in accordance with the spatial position of the representation carried by the cell with respect to a spectator, the spatial position of the representation with respect to a screen upon which said photographic images are to be projected and the ratio between width of field of view on the cell and the width of said field on projection, the shift of the cell bearing components depicted at less than projection screen distance from the observer being opposite in direction to the shift of the cells bearing components depicted at more than projection screen distance from the observer; and then photographing the shifted cells upon a different area of said film emulsion to obtain a stereoscopic complement of the first-made image said first-made image and its complement constituting a stereoscopic pair, each including components which are in superimpositionable relation and in registry with perforations of said motion picture film; and repeating the operations hereabove defined to produce successive pairs of images on said motion picture film.

5. In a method of obtaining original negative motion picture films bearing successive pairs of stereoscopic photographic images, the steps of: positioning a plurality of cells in a plane transverse to the optical axis of a camera and within the field of view thereof, said cells bearing pictorial representations of objects at different spatial positions; photographing said cells to obtain a photographic image thereof; establishing which of said pictorial representations is to be depicted virtually in the plane of a projection screen upon which the images are to be exhibited; shifting cells bearing representations of objects depicted between such selected plane and the observer in one transverse direction with respect to the optical axis of the camera; shifting cells bearing representations of objects depicted beyond the selected plane in the opposite transverse direction with respect to the optical axis of the camera; and photographing the shifted cells upon a different area of said motion picture film to obtain a stereoscopic complement of the first-recorded image to obtain a pair of stereoscopic images, each including components which are in superimpositionable relation and in registry with perforations of said motion picture film; and repeating the operations hereabove defined to produce successive pairs of images on said motion picture film, said original negative film being adapted for printing without altering the relationship of the images with respect to the perforations of the film to obtain a motion picture film suitable for projection.

6. In a method of obtaining original negative motion picture films provided with perforations and bearing successive pairs of stereoscopic photographic images, the steps of: positioning a plurality of cells in a plane transverse to the optical axis of a camera and within the field of view thereof, said cells bearing pictorial representations of objects at different spatial positions; photographing said cells to obtain a photographic image thereof; establishing which of said pictorial representations is to be depicted virtually in the plane of a projection screen upon which the images are to be exhibited; shifting cells bearing representations of objects depicted between such selected plane and the observer in one transverse direction with respect to the optical axis of the camera; shifting cells bearing representations of objects depicted beyond the selected plane in the opposite transverse direction with respect to the optical axis of the camera; controlling and regulating the shift of each cell virtually in accordance with the formula $$\text{Shift} = \frac{P_o \times I_d}{P_s + P_o} \times \frac{W_f}{W_s}$$

wherein $P_o$ is the apparent distance of the object whose representation is carried by the cell from the plane of the viewing screen, in feet; $P_s$ is the average estimated distance of a spectator from the viewing screen, in feet; $I_d$ is the estimated average interocular distance, in inches; $W_f$ is the width of the field of view, in inches, on the cell; $W_s$ is the width of the field upon projection unto the viewing screen, in inches; and photographing the shifted cells upon a different area of said motion picture film to obtain a stereoscopic complement of the first-recorded image, said first-recorded image and its complement constituting a stereoscopic pair, each including complements in the selected plane which are in superimpositionable relation and in registry with perforations of said motion picture film; and repeating the operations hereabove defined to produce successive pairs of images on said motion picture film.

7. A method for producing stereoscopic motion picture strip film arranged for projection upon a viewing screen comprising: obtaining an original negative strip film bearing pairs of stereoscopic images in succession by positioning representations of objects to be depicted at different spatial positions within the field of view of a camera; photographing said representations of objects upon strip motion picture film provided with perforations to obtain a photographic image thereof; establishing which of said representations of objects is to be depicted virtually in the plane of a projection screen upon which the images are to be exhibited; displacing representations of objects to be depicted between such selected plane and the observer in a direction parallel to the bottom of the photographic image; displacing representations of objects to be depicted beyond the selected plane in an opposite direction parallel to the bottom of the photographic image; and photographing the displaced representations of objects and the undisplaced representations of objects upon an adjacent area of said motion picture film to obtain a stereoscopic complement of the first-recorded image, said first-recorded image and its complement constituting a stereoscopic pair, each including components virtually in the plane of a projection screen which are in superimpositionable relation and in registry with perforations of said motion picture film; repeating the operations hereabove defined to produce successive pairs of images on said film; and printing said strip film without altering the relationship of the images with respect to the perforations to obtain a motion picture film suitable for projection.

KENNETH C. BRIER.
MORTIMER G. TYLER.

REFERENCES CITED

The following references are of record in the file of this patent:

UNITED STATES PATENTS

| Number | Name | Date |
|---|---|---|
| 1,494,795 | Muller | May 20, 1924 |
| 1,550,214 | Leonard | Aug. 18, 1925 |
| 1,801,656 | Burkhardt | Apr. 21, 1931 |
| 2,057,051 | Owens | Oct. 13, 1936 |
| 2,281,033 | Garity | Apr. 28, 1942 |

OTHER REFERENCES

Helmholtz: Treatise on Physiological Optics, vol. III, edited by J. P. C. Southall, 1925 (English translation), pages 299, 312, 330–333 and 360.